United States Patent
Pudipeddi et al.

(10) Patent No.: US 10,186,023 B2
(45) Date of Patent: Jan. 22, 2019

(54) UNIFIED MULTI-IMAGE FUSION APPROACH

(71) Applicant: QUALCOMM Incorporated, San Diego, CA (US)

(72) Inventors: Uday Kiran Pudipeddi, Bangalore (IN); Pawan Kumar Baheti, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 68 days.

(21) Appl. No.: 15/006,019

(22) Filed: Jan. 25, 2016

(65) Prior Publication Data

US 2017/0213330 A1 Jul. 27, 2017

(51) Int. Cl.
*G06T 5/50* (2006.01)
*G06T 7/40* (2017.01)
*G06T 5/00* (2006.01)
*H04N 5/235* (2006.01)

(52) U.S. Cl.
CPC ............... *G06T 5/50* (2013.01); *G06T 5/008* (2013.01); *G06T 7/408* (2013.01); *H04N 5/2355* (2013.01); *G06T 2207/20221* (2013.01)

(58) Field of Classification Search
None
See application file for complete search history.

(56) References Cited

U.S. PATENT DOCUMENTS 6,137,904 A * 10/2000 Lubin ............... G06T 5/50
                                                    382/162
6,271,847 B1 * 8/2001 Shum ............... G06T 15/04
                                                    345/418

(Continued)

FOREIGN PATENT DOCUMENTS

EP          1110381 B1    7/2003

OTHER PUBLICATIONS

Mertens et al., "Exposure Fusion: A Simple and Practical Alternative to High Dynamic Range Photograph", Computer Graphics CS Fourm, vol. 28, No. 1, 38 Mar. 2009.*

(Continued)

*Primary Examiner* — Hilina K Demeter
(74) *Attorney, Agent, or Firm* — Paradice and Li LLP

(57) ABSTRACT

Systems and methods are provided for merging multiple images to produce a single fused image having desirable image characteristics derived from the multiple images. For example, the system may determine image characteristics for first and second images. The image characteristics may be related to contrast, exposure, color saturation, and the like. Based on the image characteristics, the system may generate a combined luma weight map. The system may decompose the first and second images and the combined luma weight map. In an example, the first image, the second image, and the combined luma weight map may be represented as scale-space representations having multiple scales or levels. The system may merge the decomposed representations of the first and second images and the combined luma weight map to form a decomposed representation of the fused image. The system may generate the actual fused image from the decomposed representation of the fused image.

30 Claims, 10 Drawing Sheets

(56) References Cited

U.S. PATENT DOCUMENTS

| | | | | |
|---|---|---|---|---|
| 7,894,662 | B2* | 2/2011 | Bushell | G06K 9/2018 382/108 |
| 8,606,042 | B2 | 12/2013 | Yadav et al. | |
| 8,836,793 | B1* | 9/2014 | Kriesel | H04N 9/045 348/164 |
| 8,885,976 | B1* | 11/2014 | Kuo | H04N 5/211 382/103 |
| 9,083,935 | B2 | 7/2015 | Demandolx et al. | |
| 9,686,537 | B2* | 6/2017 | Geiss | H04N 17/002 |
| 9,697,592 | B1* | 7/2017 | Dai | G06T 5/009 |
| 2006/0239579 | A1* | 10/2006 | Ritter | G06T 5/50 382/274 |
| 2008/0158239 | A1* | 7/2008 | Lamy | G06F 3/016 345/581 |
| 2009/0027391 | A1* | 1/2009 | Burley | G06T 15/04 345/426 |
| 2009/0208108 | A1* | 8/2009 | Shimano | G06K 9/4661 382/190 |
| 2010/0278448 | A1* | 11/2010 | Friedhoff | G06T 7/187 382/274 |
| 2011/0211732 | A1* | 9/2011 | Rapaport | G06F 3/1454 382/107 |
| 2012/0050474 | A1* | 3/2012 | Segall | G06T 5/50 348/43 |
| 2013/0070965 | A1* | 3/2013 | Jang | G06K 9/60 382/103 |
| 2014/0270567 | A1* | 9/2014 | Smith | G06T 5/002 382/264 |
| 2014/0307960 | A1* | 10/2014 | Sharma | H04N 5/23229 382/162 |
| 2015/0023594 | A1* | 1/2015 | Zhang | G06T 3/4015 382/167 |
| 2015/0063694 | A1* | 3/2015 | Shroff | G06T 11/60 382/167 |
| 2015/0097927 | A1* | 4/2015 | Zhao | H04N 13/271 348/43 |
| 2015/0302563 | A1* | 10/2015 | Karsch | H04N 5/272 382/274 |
| 2015/0350509 | A1* | 12/2015 | Tico | H04N 5/23277 348/362 |
| 2016/0065864 | A1* | 3/2016 | Guissin | G06T 5/008 348/239 |
| 2017/0261741 | A1* | 9/2017 | Stoppe | G02B 21/367 |

OTHER PUBLICATIONS

Mertens et al. "Exposure Fusion: A Simple and Practical Alternative to High Dynamic Range Photography" (Year: 2008).*

TuFuse "Two Stage Exposure and Focus Blending Software" (Year: 2012).*

Singh H., et al., "A Novel Approach for Detail-Enhanced Exposure Fusion Using Guided Filter", The Scientific World Journal, vol. 2014, Jan. 31, 2014, XP055354306, pp. 1-8.

International Search Report and Written Opinion—PCT/US2017/012923—ISA/EPO—Mar. 22, 2017.

Mertens T., et al., "Exposure Fusion: A Simple and Practical Alternative to High Dynamic Range Photography", Computer Graphics CS Forum, vol. 28, No. 1, 38 Mar. 2009, XP055011663, pp. 161-171.

* cited by examiner

UNIFIED MULTI-IMAGE FUSION APPROACH

BACKGROUND

Field of Invention

This disclosure relates to combining two or more images to produce a fused image.

Description of Related Technology

Some image processing devices, such as smartphones or tablet computers, are able to capture images of objects (e.g., a person, place, location, etc.). Such image processing devices may also process the images to feature desirable aspects of the images and to mitigate undesirable aspects of the images. For example, an image processing device may perform post-processing operations on an image to reduce red-eye, to improve color balance, and/or to apply different photographic filters to the image to make the image more visually appealing to the user.

Multi-image fusion is a post-processing technique in which desirable aspects of separate images of the same scene are blended together, thereby increasing the overall visual quality of the resulting or "fused" image. Some multi-image-fusion techniques allow image processing devices to generate a fused image that incorporates exposure information from multiple images (sometimes referred to as multi-exposure fusion or high-dynamic-range imaging). In multi-exposure fusion, multiple images of the same scene are combined to achieve a high dynamic range. For example, multi-exposure fusion may blend images that feature a light source (e.g., the sun) in the background and a non-light source (e.g., a person) in the foreground.

Other multi-image fusion techniques may be used to generate a fused image that incorporates focus characteristics from multiple images (sometimes referred to as "multi-focus fusion"). In multi-focus fusion, multiple images of the same scene are captured, and each image is focused on a different object in the scene. For example, one image may have the background object in focus, and a second image may have the foreground object in focus. These images are fused/blended together in order to generate a consolidate image in which each object is in focus.

Another multi-image fusion technique is used to generate a fused image that incorporates different illumination characteristics from multiple images (sometimes referred to as "multi-illuminant fusion"). In multi-illuminant fusion, multiple images of the same scene are combined to achieve compensation for each illuminated object in the scene. For example multi-illuminant fusion may blend images that feature objects illuminated by a natural day light and objects illuminated by indoor lights such as cool-white fluorescent light or tungsten-based light. However, each of these techniques alone provides a sub-optimal solution, and combinations of such techniques can require enormous processing power which may not be available or desired.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly.

Various embodiments include a method of fusing multiple images with an image processing device by determining first image characteristics of a first image and second image characteristics of a second image, the first image depicting a target scene and the second image depicting the target scene, generating a combined luma weight map based on the first image characteristics of the first image and the second image characteristics of the second image, decomposing the first image, the second image, and the combined luma weight map, and generating a fused image of the first image and the second image based at least in part on the decomposed first image, the decomposed second image, and the decomposed luma weight map.

In some embodiments, the first image may include a first object and a second object having the first image characteristics, and the second image may include the first object and the second object having the second image characteristics.

In some embodiments, generating a combined luma weight map based on the first image characteristics and the second image characteristics may include determining first weight maps representative of the first image characteristics, generating a first luma weight map of the first image based on the first weight maps, determining second weight maps representative of the second image characteristics, generating a second luma weight map of the second image based on the second weight maps, and generating the combined luma weight based on the first luma weight map and the second weight map. In some embodiments, each of the first weight maps and the second weight maps may include two or more of a contrast weight map, an exposure weight map, and a color saturation weight map.

In some embodiments, determining first weight maps of the first image characteristics of the first image may include determining luma values and chroma values of the first image, determining a contrast weight map of the first image by performing a high-pass filter operation on the luma values of the first image, determining an exposure weight map of the first image based on a difference between the luma values of the first image and an expected luma value, and determining a color saturation weight map of the first image based on the chroma values of the first image or based on the chroma values of the first image and the luma values of the first image. In some embodiments, the method may further include receiving the expected luma value via a user input.

In some embodiments, the method may further include generating a combined color weight map based on the first image characteristics and the second image characteristics. In some embodiments, generating a combined color weight map may include generating the combined color weight map based on the first weight maps and the second weight maps.

In some embodiments, decomposing the first image, the second image, and the combined luma weight map may include generating a scale-space representation ("SSR") of the first image, generating an SSR of the second image, and generating an SSR of the combined luma weight map. In some embodiments, generating the SSR of the first image may include performing upscaling and downscaling operations on the first image. In some embodiments, the upscaling and downscaling operations may be bilinear upscaling and bilinear downscaling operations. In some embodiments, other upscaling and downscaling operations may be used, for example, Gaussian scaling operations.

In some embodiments, generating the fused image of the first image and the second image based at least in part on the decomposed first image, the decomposed second image, and the decomposed luma weight map may include generating an SSR of the fused image by combining levels of the SSR of the first image with corresponding levels of the SSR of the second image and with corresponding levels of the SSR of the luma weight map, and collapsing the SSR of the fused image into a single level representation of the fused image. In some embodiments, the method may further include generating a combined color weight map based on the first image characteristics and the second image characteristics, and generating the fused image by applying the combined color weight map to the single level representation of the fused image.

In some embodiments, the method may further include determining image characteristics of a third image and image characteristics of the fused image, the third image depicting the target scene, generating another combined luma weight map based on the image characteristics of the third image and the image characteristics of the fused image, decomposing the third image, the fused image, and the other combined luma weight map, and generating another fused image of the third image and the fused image based at least in part on the decomposed third image, the decomposed fused image, and the decomposed other luma weight map.

In some embodiments, the method may further include determining third image characteristics of a third image, the third image depicting the target scene, generating another combined luma weight map based on the second image characteristics of the second image and the third image characteristics of the third image, and decomposing the second image, the third image, and the other combined luma weight map.

In some embodiments, generating a fused image of the first image and the second image may include generating a first scale-space representation ("SSR") based on the decomposed first image, the decomposed second image, and the decomposed combined luma map, generating a second SSR based on the decomposed second image, the decomposed third image, and the decomposed other combined luma map, combining the first SSR and the second SSR to generate a combined SSR, and generating a fused image of the first image, the second image, and the third image based at least in part on the combined SSR.

Various embodiments may also include a system that includes a memory and a processor coupled to the memory and configured with processor-executable instructions to perform operations of the above method.

Various embodiments may also include a system that may include means for performing the operations of the above method.

Various embodiments may also include non-transitory, computer-readable medium having stored thereon computer-executable software instructions configured to cause a processor of an image processing device to perform steps of the above method.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, briefly described below.

DETAILED DESCRIPTION

Figure 1A:
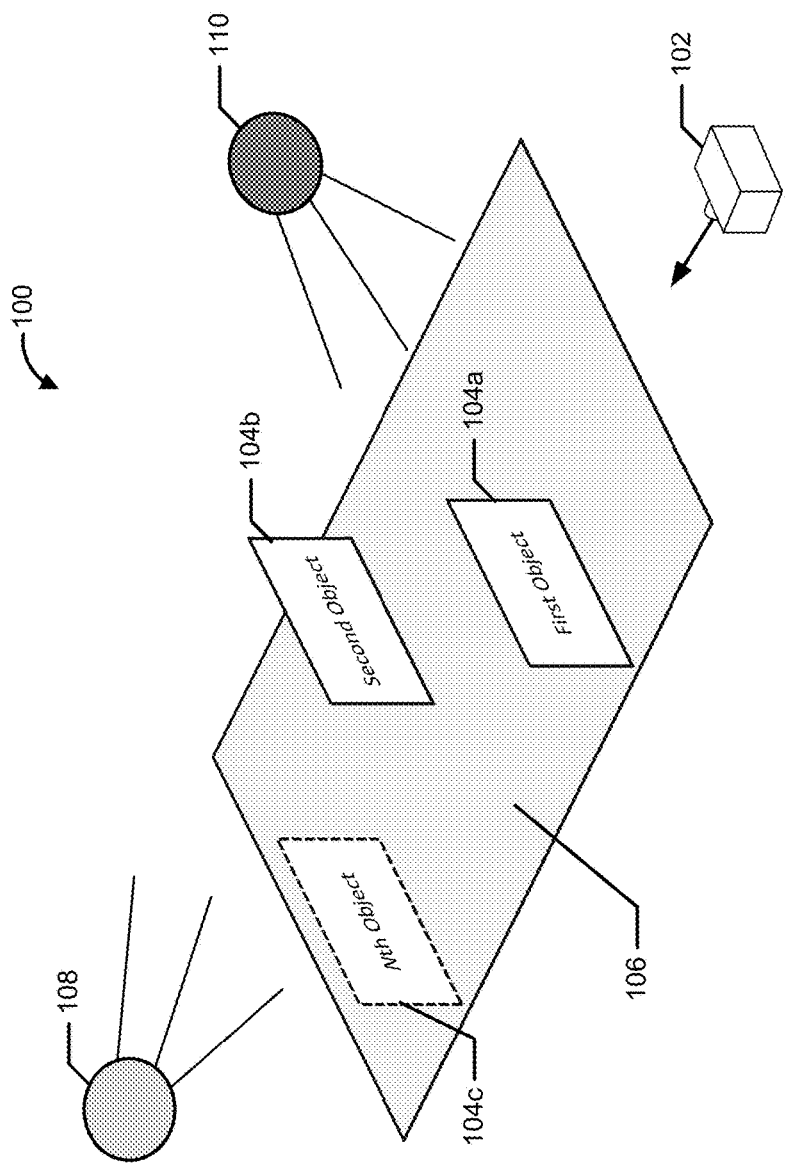
FIG. 1A is a component diagram illustrating an example of a scene including multiple objects, according to some embodiments.

As noted above, some image processing devices are capable of performing multi-image fusion to produce higher-quality images. However, current techniques are limited to improving a single image characteristic of the images, such as focus or exposure. The limitations of current multi-image fusion techniques are especially apparent when images of the same scene have objects focused at different distances and illuminated differently as well, or otherwise have more than one image characteristic (e.g., exposure, focus etc.) captured. For example, an image processing device may implement current multi-image fusion techniques to form a fused image that is in focus or a fused image that has a good dynamic range, but not both.

In a sub-optimal solution, the image processing device may perform both multi-focus fusion and multi-exposure fusion to generate an image that has a good dynamic range and that is in focus with respect to multiple objects. However, the image processing device may be required to perform one of these multi-image fusion processes in its entirety before the image processing device is able to perform the other multi-image fusion process. As a result, performing multi-image fusion in this manner may require substantial processing resources to handle more than one image characteristic.

In overview, aspects of the present disclosure include systems and methods for performing, in a single pass, multi-image fusion of two or more images with respect to two or more image characteristics. In some embodiments, the image processing device may perform a multi-image fusion process to determine luma and color information for multiple images of the same scene. Based on this luma and color information, the multi-image fusion process may generate a combined luma weight map that accounts for multiple image characteristics (e.g., focus, contrast, exposure, and color saturation). Using this combined luma weight map, the multi-image fusion process may merge the multiple images into a single representation of the fused image. The multi-image fusion process may also generate a combined color weight map based on color information for the multiple images. The multi-image fusion process may apply this color weight map to the single representation of the fused image to generate the final fused image. By performing this process in a single pass, the multi-image fusion process may generate a final fused image that includes a blend of desirable aspects related to each of the multiple image characteristics without having to perform a separate multi-image fusion process for each of the multiple image characteristics.

For ease of description, some embodiments described herein may refer to a "first image" and a "second image." References to an image as a "first image" or a "second image" are used herein merely for ease of description and do not require any particular image to be a "first" or a "second" image. Further, while descriptions of some embodiments sometimes refer to merging two images, the multi-image fusion process may perform the above process to combine/fuse two or more images, as further described herein. As such, any reference or description related to merging a first image and a second image is for ease of description and is not limiting.

In some embodiments, the image processing device may receive, capture, or otherwise obtain a first image and a second image of the same scene (a "target scene"). Each of the first and second images may depict the same objects, but the first and second images may be associated with different image characteristics. For example, the objects may have a different exposure in the first image than in the second image. In another example, only one object in the target scene may be in focus in the first image, while another object in the target scene is in focus in the second image. In yet another example, the first image of the target scene and the second image of the target scene may be illuminated by different light sources (e.g., a cool-white-fluorescent light versus natural daylight), and the light sources maybe in different positions relative to the target scene.

The multi-image fusion process may determine luma and chroma values for each of the first and second images. In some embodiments, an image may include multiple visual elements (e.g., pixels) that represent the image. Each visual element (sometimes referred to as an "element") may be described using a luma value and a chroma value. A luma value of an element may represent the intensity value of that element (e.g., a greyscale value for a pixel of the image). A chroma value of the element may represent the color/chrominance of the element. Based on the luma and chroma values for each element of the first image, the multi-image fusion process procedure may generate multiple weight maps that represent multiple image characteristics, respectively. For example, the multi-image fusion process (service) may use the luma and chroma values of the first image to generate a weight map that represents the contrast of the first image, a weight map that represents the exposure of the first image, and a weight map that represents the color saturation of the first image. Because the weight maps representing multiple image characteristics are orthogonal to each other, the multi-image fusion process may merge these weight maps together to form a luma weight map and a color weight map for the first image that account for these multiple image characteristics. The multi-image fusion process may perform similar operations for the second image to form a luma weight map and a color weight map for the second image.

The multi-image fusion process may combine the luma weight map of the first image and the luma weight map of the second image to create a combined luma weight map. In some embodiments, the combined luma weight map may describe the intended luma weights that will be applied to luma values of the first and second images when merging those images together to form the fused image. Similarly, the multi-image fusion process may combine the color weight maps for the first and second images to form a combined color weight map. The combined color weight map may also describe the respective weights of the chroma values of the elements of the first and second images as represented in the fused image.

In some embodiments, a multi-image fusion process may decompose the first and second images, and the combined luma weight map, to place this image information in a form suitable for merging together. In some embodiments, the multi-image fusion process may generate scale-space representations ("SSR") of the first and second images and the combined luma weight map. Each SSR may represent a certain number of different representations or scales of an image, and each representation may be referred to herein as a "level" of the SSR. For example, in some embodiments, a level of an SSR of the first image be a representation the first image at a scale of one-half ($\frac{1}{2}$) of the original first image; that is, the SSR level may be an image having half the number of pixels as an x-dimension of the first image and half the number of pixels as a y-dimension of the first image. In some examples, an SSR of an image having four levels may include a set of representations of the image at scales of $\frac{1}{2}$, $\frac{1}{4}$, $\frac{1}{8}$, and $\frac{1}{16}$ of the image. The multi-image fusion process may generate SSRs of the first image, second image, and combined luma weight map such that each of the SSRs has the same number of levels. For example, each of the SSRs may include five levels representing four different scales or representations of the entities. The multi-image fusion process may merge each respective level of the SSRs of the first and second images and the combined luma weight map to generate a single SSR representation of the fused image. The multi-image fusion process may collapse the SSR representation into a single level. The multi-image fusion process may then apply the combined color weight map to that single level to form the actual fused image.

As noted above, the combined luma and color weight maps may account for multiple image characteristics. As a result, the fused image generated based on the combined luma and color weight maps may include desirable features related to each of those multiple image characteristics. Further, a multi-image fusion process may utilize the combined luma and color weight maps to generate the final image in one pass instead of performing a different multi-image fusion process for each of the multiple image characteristics.

Particularly, the multi-image fusion process may fuse two or more images together to form a single fused image. In some embodiments, the multi-image fusion process may fuse the first image and the second image together to form a fused image, such as by performing the operations described above. In order to fuse one or more additional images (e.g., a third image), the multi-image fusion process may perform the fusion process again using the third image and the fused image produced from the first image and the second image. For example, the multi-image fusion process may generate combined luma and color weight maps based on image characteristics of the fused image and the third image; decompose the fused image, the third image, and the combined luma weight map; and may generate another fused image based on the decomposed fused image, the decomposed third image, and the decomposed combined luma weight map. The multi-image fusion process may fuse additional images may in a similar fashion.

In some embodiments, the multi-image fusion process may combine more than two images together by generating an SSR representation of an intermediate fused image for pairs of images (e.g., an SSR of a fused image based on the first image and the second image, an SSR representation of a fused image based on the second image and the third image, and so on). The multi-image fusion process may then combine each separate SSR of an intermediate fused image to produce an SSR of the final fused image. The multi-image fusion process may generate the actual final fused image from the SSR of the final fused image by performing operations similar those described above.

In some embodiments, an image (e.g., the first image, second image, and fused image) may be represented as a two-dimensional array of visual elements (e.g., picture elements or pixels in a bitmap). Further, a particular visual element of the two-dimensional array of visual elements of an image may be identified based on an (x,y) coordinate value. In such embodiments, a weight map associated with an image may similarly be represented as a two-dimensional array, and each weight of the weight map may be identified based on an (x,y) coordinate value that corresponds with a value of the image at the same (x,y) coordinate value. For example, a weight located at a coordinate (1, 20) in a weight map that is associated with an image may correspond with a value located at a coordinate (1, 20) in that image.

Further, as used herein, references to "merging," "fusing," "combining," or "blending" multiple images all generally refer to a process of generating a single image from multiple images (for example, pixel data or other information/characteristics from multiple images) of the same scene such that the image characteristics of the single image is derived at least in part from the respective image characteristics of the multiple images. For ease of description, this generated single image is sometimes referred to herein as the "fused image," though the single image may also be referred to as the "blended image," "combined image," "merged image," "output image," "final image," or the like.

Various embodiments will be described in detail with reference to the accompanying drawings. Wherever possible, the same reference numbers will be used throughout the drawings to refer to the same or like part. References made to particular examples and implementations are for illustrative purposes, and are not intended to limit the scope of the invention or the claims. Features of embodiments described herein and/or with reference to one figure may be combined with features in other embodiments, unless explicitly stated otherwise or unless technically impractical.

FIG. 1A illustrates a component diagram 100 representing an example scene 106 that includes multiple objects, according to some embodiments. The scene 106 may be referred to as a target scene. As illustrated, the scene 106 may include a first object 104*a* and a second object 104*b*. The objects 104*a* and 104*b* may be any object that may be depicted or captured as part of a digital image. Non-limiting examples of objects may include people, animals, locations or areas, buildings, furniture, lamps, or various other objects or combinations of objects that may be rendered as a digital image.

In capturing an image of the scene 106, an image sensor of the image processing device 102 may capture a digital representation of each of the objects 104*a* and 104*b*. From the perspective of an image processing device 102, the image characteristics of the first object 104*a* and the image characteristics of the second object 104*b* may appear to be different. In the example illustrated in FIG. 1A, the first object 104*a* may be closer to the image processing device 102 than the second object 104*b*. As a result, the distance from the first object 104*a* to the image processing device 102 may be less than the distance from the second object 104*b* to the image processing device 102. Because image processing devices are typically limited to focusing on objects in the same depth of field, that is, having a relatively similar object-to-lens (of the image processing device) distance, images captured with the image processing device 102 may depict one of the objects 104*a* and 104*b* in focus, while the other object may be out of focus.

The differences of respective image characteristics of the objects 104*a* and 104*b* may also include various other visual differences, such as different color temperatures (incandescent light versus sun light), different levels of illumination (e.g., brightly lit versus dimly lit), and the like. In the example illustrated in FIG. 1A, the first object 104*a* may be illuminated by a (first) light source 110 (e.g., an incandescent light bulb), while the second object 104*b* may be illuminated by a (second) light source 108 (e.g., a florescent light). The light sources 110, 108 may be the same or different. For example, the light sources 110, 108 may produce light of a different color temperature, each generating a different spectrum of wavelengths that affect how an object is perceived by a person or recorded by a sensor. Due to these possible differences in lighting, images captured with the image processing device 102 may have a drastic or undesirable visual depiction of the objects 104*a* and 104*b*, such as featuring the first object 104*a* in warm light while featuring the second object 104*b* in a cool light.

In another example, the light source 110 may provide a strong illumination of the object 104*a*, either due to the closeness of the light source 110 to the object 104*a*, or due to the relative power of the light source 110. On the other hand, the light source 108 may illuminate the second object 104*b* to a lesser degree, causing the second object 104*b* to appear to be dimly lit from the perspective of the image processing device 102. As a result, the first object 104*a* may be brightly illuminated in some images captured with the image processing device 102, while the second object 104*b* may be poorly lit. In another example, there may be only one light source, but due to its position relative to objects in the scene, the objects are illuminated differently by the one light source.

In most cases, the image processing device 102 may account for or improve undesirable image characteristics for only one of the objects 104*a* and 104*b* when capturing an image. In other words, the image processing device 102 may be capable of capturing an image of the scene 106 in which one of the objects 104*a* and 104*b* has a high quality at the expense of the other object. As discussed in the above examples, the image processing device 102 may capture an image of the scene 106 in which one of the objects 104*a* and 104*b* is in focus and well illuminated while the other object is not in focus and poorly illuminated.

Figure 1B:
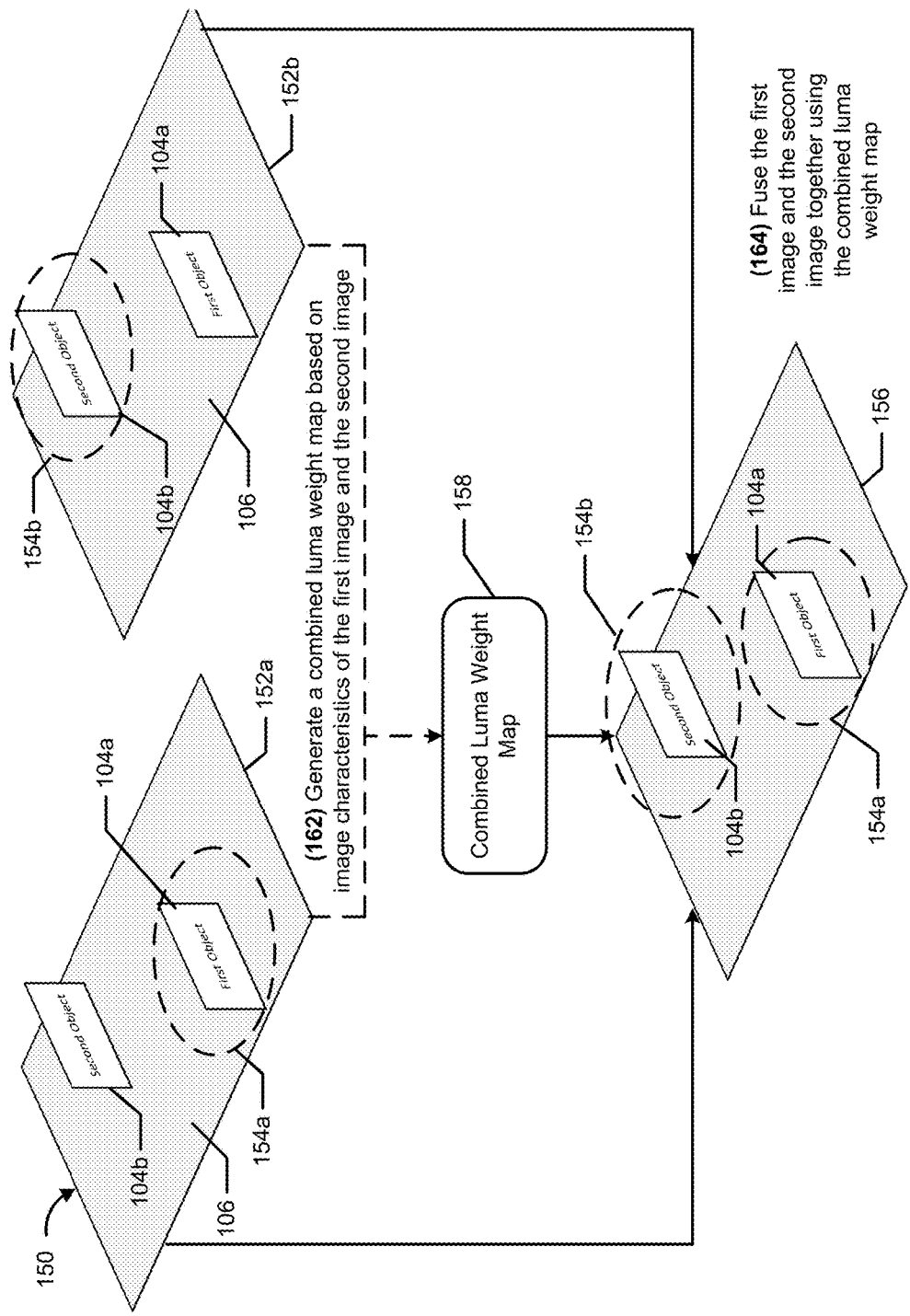
FIG. 1B is a schematic illustrating an example of a process for fusing two images of a scene together using a combined luma weight map, according to some embodiments.

In some embodiments, the image processing device 102 may compensate for the different image characteristics of the objects 104*a* and 104*b* by capturing a separate image for each of the objects 104*a* and 104*b* and merging those images together, as illustrated in a process 150 illustrated in FIG. 1B. In particular, the image processing device 102 may capture a separate image for each of the objects 104*a* and 104*b* that features the desirable image characteristics of that respective object. For example, the image processing device 102 may capture a first image 152a of the scene 106 that features desirable image characteristics of the first object 104a, as indicated by an indicator 154a. In this example, the first image 152a may depict the first object 104a in focus and with a desirable exposure, among other image characteristics. Similarly, the image processing device 102 may capture a second image 152b of the scene in which desirable image characteristics of the second object 104b are featured, as indicated by an indicator 154b.

Because each of these images 152a and 152b may separately feature desirable image characteristics of the objects 104a and 104b, the image processing device 102 may combine those separate images in a single pass to form a fused image that depicts the desirable image characteristics of the objects 104a and 104b. To accomplish this, the image processing device 102 may generate a combined luma weight map 158, in operation 162. The combined luma weight map 158 may indicate a weight to be respectively applied to the luma values of elements of the images 152a and 152b when combining those images. In some embodiments, the combined luma weight map 158 may be generated based on weight maps associated with multiple image characteristics of the first and second images 152a and 152b (e.g., weight maps associated with color saturation, exposure, contrast, etc.). Generating the combined luma weight map 158 is discussed in various embodiments described herein.

The image processing device 102 may fuse the first image 152a and the second image 152b together using the combined luma weight map 158, in operation 164. The resulting fused image 156 may feature the desired image characteristics of both the objects 152a and 152b, as indicated with the indicators 154a and 154b.

In some embodiments, the scene 106 may include an arbitrary number of two or more objects having varying characteristics. For instance, in addition to the first object 104a and the second object 104b, the scene may include other images objects, such as an nth object 104c, that may have different image characteristics than the first object 104a or the second object 104b. For example, the nth object 104c may be illuminated differently, may have a different distance to the image processing device 102, or may differ in one or more other image characteristics. In such embodiments, the image processing device 102 may capture or obtain a separate image for each of the objects in the scene (e.g., three images for the objects 104a-c) and may fuse all of the images into a single, final image, as described further herein.

Figure 2:
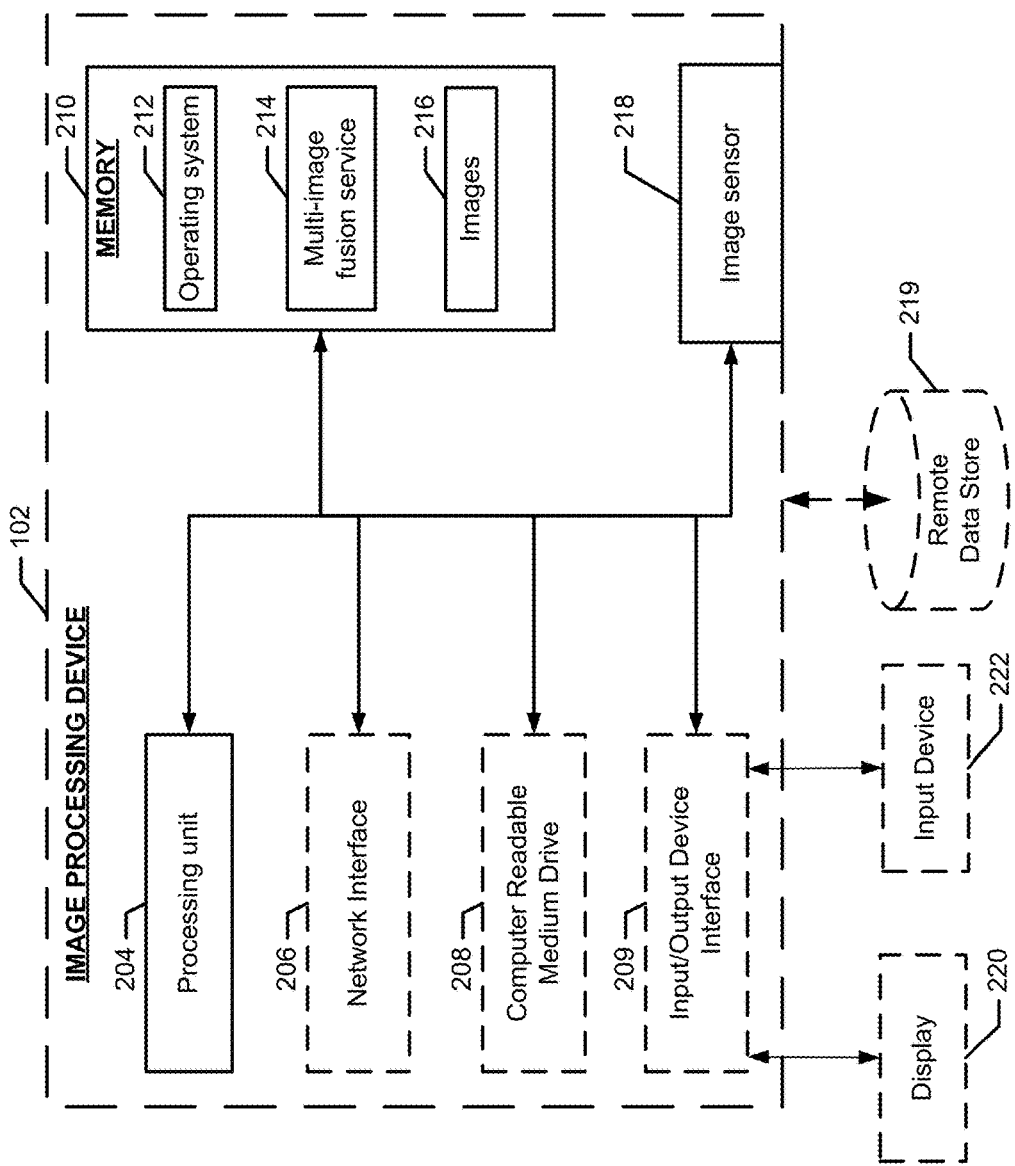
FIG. 2 is a component block diagram illustrating an example of a computing device suitable for use with some embodiments.

FIG. 2 depicts a general architecture of the image processing device 102 configured to implement one or more image-fusion processes, according to various embodiments. The general architecture of the image processing device 102 depicted in FIG. 2 includes an arrangement of computer hardware and software components that may be used to implement aspects of the present disclosure. The image processing device 102 may include many more (or fewer) elements than those shown in FIG. 2. It is not necessary, however, that all of these generally conventional elements be shown in order to provide an enabling disclosure.

As illustrated, the image processing device 102 may include a processing unit 204, a network interface 206, a computer readable medium drive 208, an input/output device interface 209, an optional display 220, and an optional input device 222, all of which may communicate with one another by way of a communication bus 225. The network interface 206 may provide connectivity to one or more networks or computing systems. For example, the processing unit 204 may receive and/or send information and instructions from/to other computing systems or services via one or more networks (not shown). The processing unit 204 may also communicate to and from a memory 210 and may further provide output information for the optional display 220 via the input/output device interface 209. The optional display 220 may be external to the image processing device 102 or, in some embodiments, may be part of the image processing device 102. The display 220 may comprise an LCD, LED, or OLED screen, and may implement touch sensitive technologies. The input/output device interface 209 may also accept input from the optional input device 222, such as a keyboard, mouse, digital pen, microphone, touch screen, gesture recognition system, voice recognition system, or other input device known in the art.

The memory 210 may include computer- or processor-executable instructions (grouped as modules or components in some embodiments) that the processing unit 204 may execute in order to implement one or more embodiments. The memory 210 may generally include random-access memory ("RAM"), read-only memory ("ROM"), and/or other persistent, auxiliary, or non-transitory computer-readable media. The memory 210 may store an operating system 212 that provides computer program instructions for use by the processing unit 204 in the general administration and operation of the image processing device 102. The memory 210 may further include computer program instructions and other information, stored in the memory 210, process 214 for implementing aspects of the present disclosure. In addition, the memory 210 may communicate with an optional external data storage unit 224.

In some embodiments, the memory 210 may store or include digital representations of images 216 obtained on the image processing device 102. In some embodiments, the images 216 stored in the memory 210 may include images captured using an image sensor 218. The image sensor 218 may be one of various types of image sensors suitable for receiving light from a scene (e.g., the scene 106 as described with reference to FIG. 1A). The image sensor 218 may convert the light into a digital signal, which may be stored as image in the memory 210. The images 216 may be stored in one or more image file formats, such as a bitmap or raster format (e.g., JPEG, GIF, and BMP) or as vector graphic formats (e.g., scalable vector graphics or "SVG" format). In some embodiments, the images 216 may include images received over a network (not shown) via the network interface 206. In such examples, the images 216 may include image files receives from a website, from a network device, or from an optional remote data store 219.

In some embodiments, the memory 210 may include a multi-image fusion process 214, which may be executed by the processing unit 204 to perform operations according to various embodiments. For example, the processing unit 204 may execute the multi-image fusion process 214 in order to generate a combined *lama* weight map that accounts for multiple image characteristics of multiple images. The multi-image fusion process 214 may use the combined luma weight map to merge multiple images together to produce a fused image that represents a blend or fusion of the multiple image characteristics of the multiple images. While the multi-image fusion process 214 is illustrated in FIG. 2 as a separate module stored in the memory 210, in some embodiments, the multi-image fusion process 214 may be included and/or implemented in the operating system 212 or as a component of the processing unit 204, and as such, a separate multi-image fusion process 214 may not be required to implement various embodiments.

In some embodiments, the processing unit 204 may utilize the input/output device interface 209 to display or output a fused image on the display 220. For example, the processing unit 204 may cause the input/output device interface 209 to display the fused image for a user of the image processing device 102. In some embodiments, the processing unit 204 may store the fused image with the images 216 stored in the memory 210. As such, the fused image may be recalled from the memory 210 at a later, such as in response to a user request received via the input/output device interface 209.

Figure 3:
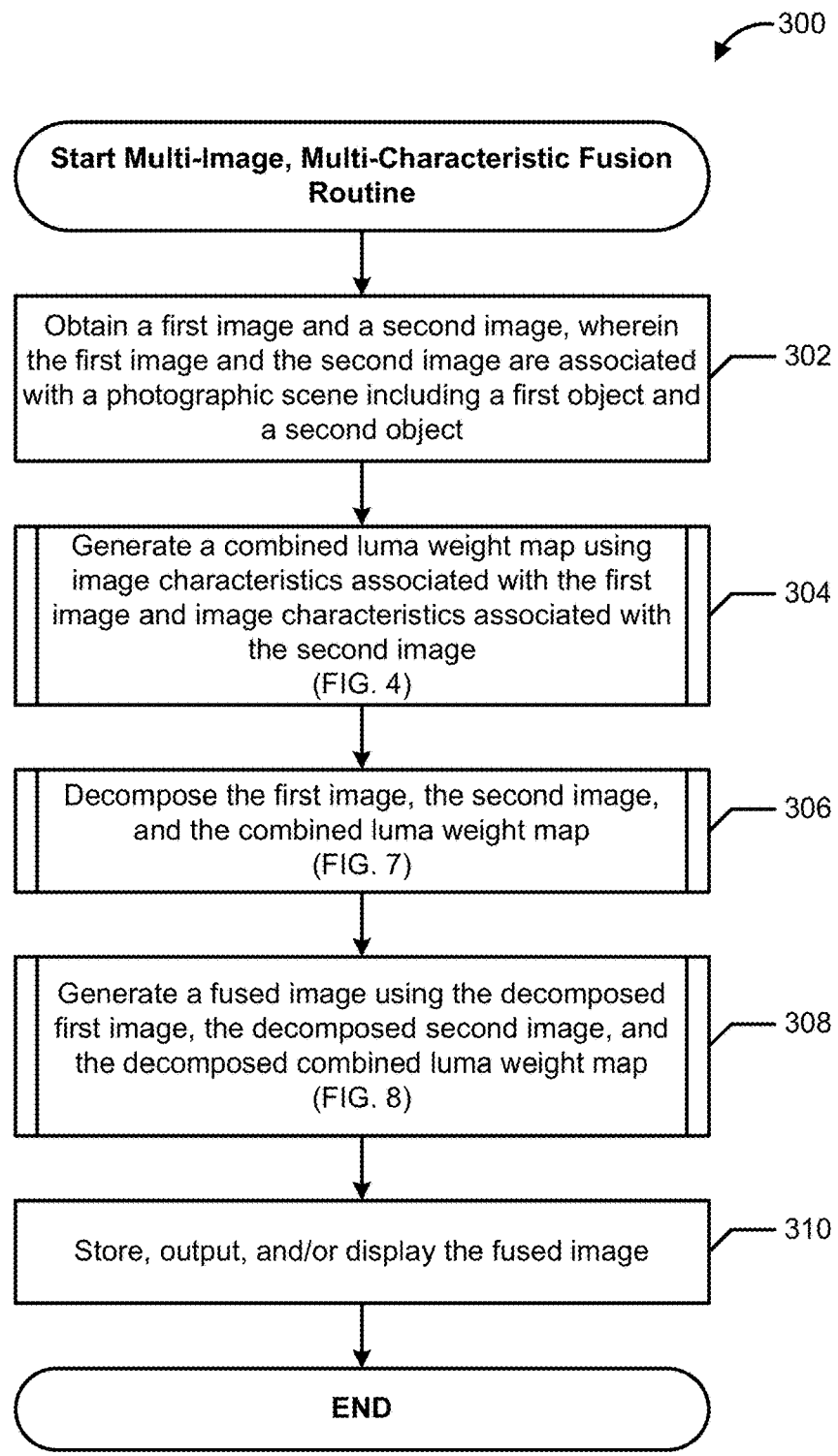
FIG. 3 is a process flow diagram illustrating an example of a computer-implemented method for generating a fused image from multiple images of the same scene, according to some embodiments.

FIG. 3 is a process flow diagram of an illustrative routine 200 for performing multi-image fusion of multiple images to generate a fused image having image characteristics derived from the multiple images, according to some embodiments. The routine 300 may be implemented with a multi-image fusion process operating on a computing device (e.g., the multi-image fusion process 214 of the image processing device 102 as described with reference to FIG. 4A).

In block 302, the multi-image fusion process 214 may obtain a first image and a second image. In some embodiments, the first and second images may depict the same scene, and the scene may include two separate objects. The first image may correspond to or feature desirable image characteristics of the first object, and the second image may correspond to or feature desirable image characteristics of the second object. For example, the first object may be in focus in the first image and not in focus in the second image, whereas the second object may be in focus in the second image and not in focus in the first image. In another example, the first object may be depicted as well illuminated in the first image, whereas the first object may be depicted as poorly illuminated or illuminated by a different light source in the second image.

The multi-image fusion process 214 may generate a combined luma weight map based on image characteristics associated with the first image and image characteristics associated with the second image, in block 304. In particular, the multi-image fusion process 214 may determine the luma and chroma values of each of the first and second images. The multi-image fusion process 214 may then use the luma and chroma values of each image to generate weight maps for multiple image characteristics (e.g., contrast, exposure, and saturation) corresponding to that image. The multi-image fusion process 214 may then use these weight maps corresponding to the multiple image characteristics to generate separate luma weight maps the first and second images. The multi-image fusion process 214 may combine the luma weight maps. In some embodiments, the combined luma weight map may represent the weight or emphasis to be applied to luma values of the first and second images when fusing those images together. The process of generating the combined luma weight map is further described herein with reference to FIG. 4.

In block 306, the multi-image fusion process 214 may decompose the first image and the second image obtained in block 302 and may also decompose the combined luma weight map generated in block 304. In some embodiments of the operations performed in block 306, the multi-image fusion process 214 may generate multiple representations of each of the first image, the second image, and the combined luma weight map. For example, each of the first image, the second image, and the combined luma weight map may be represented in the form of scale-space representations or "SSRs." Each SSR may include multiple scale representations or levels, and the SSRs for each of the first image, the second image, and the combined luma weight map may have the same number of levels. The process of decomposing the first image, the second image, and the combined luma weight map is further described with reference to FIGS. 6 and 7.

The multi-image fusion process 214 may use the decomposed representations of the first image, second image, and combined luma weight map to generate a fused image, in block 308. In particular, the multi-image fusion process 214 may merge each corresponding level of the SSRs of the first image, second image, and the unified image to generate an SSR representation of the fused image. In a non-limiting example in which the SSRs of the first image, second image, and the unified image include five levels each, the multi-image fusion process 214 may merge the first levels of each of the SSRs to form the first level of the SSR of the fused image. Similarly, the multi-image fusion process 214 may merge the next four levels to form the remaining four levels of the SSR of the fused image. The multi-image fusion process 214 may utilize the SSR of the fused image to produce the actual fused image, such as via a process of collapsing the separate levels of the SSR of the fused image into a single level. The process for generating the fused image based on the decomposed first image, second image, and combined luma weight map is further described with reference to FIG. 8.

In block 310, the multi-image fusion process 214 may store and/or output the fused image. For example, the multi-image fusion process 214 may store the fused image in memory of the image processing device (e.g., the memory 210 of the image processing device 102). In another example, the multi-image fusion process 214 may cause the fused image to be output to a display of the image processing device. In some embodiments, the multi-image fusion process 214 may cause the fused image to be sent to another computing device over a network communication channel.

The multi-image fusion process 214 may then terminate operations of the routine 300.

Figure 4:
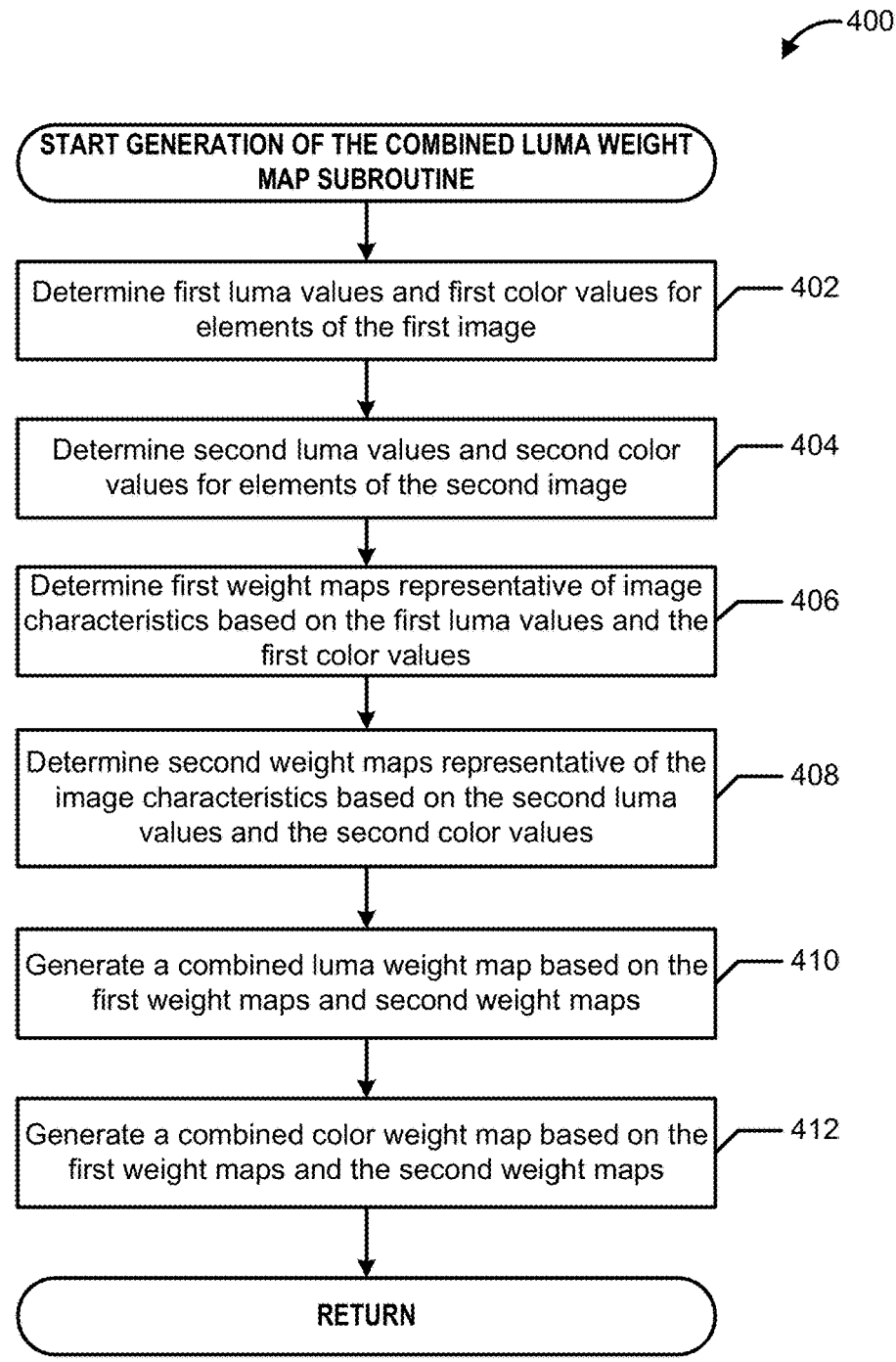
FIG. 4 is a process flow diagram illustrating an example of a computer-implemented method for generating a combined luma weight map based on weight maps associated with image characteristics of multiple images of the same scene, according to some embodiments.

FIG. 4 is a process flow diagram of an illustrative subroutine 400 for generating a combined luma weight map from images characteristics of a first image and a second image, according to some embodiments. The subroutine 400 may be implemented with a multi-image fusion process (service) operating on a computing device (e.g., the multi-image fusion process 214 of the image processing device 102 as described with reference to FIG. 4A).

As described (e.g., with reference to FIG. 3), the multi-image fusion process 214 may obtain a first image and a second image that depict the same scene. However, each of the first and second images may be associated with a different exposure, different illuminations, and various other different image characteristics. Because each of the first image and the second image may have some desirable image characteristics and some undesirable or less desirable image characteristics, the multi-image fusion process 214 may perform the following operations to calculate a combined luma weight map that represents the degree to which image characteristics represented in the first image and the image characteristics represented in the second image should be represented in the fused image. Specifically, the multi-image fusion process 214 may utilize the combined luma weight map to emphasize desirable image characteristics of the images while deemphasizing undesirable image characteristics of those images.

In block 402, the multi-image fusion process 214 may determine first luma values and first chroma values for the first image. In some embodiments of the operations performed in block 402, the multi-image fusion process 214 may analyze visual elements of the first image. In a non-limiting example in which the first and second images are represented as a two-dimensional array of elements (e.g., picture elements or "pixels" in a raster or bitmap image), the multi-image fusion process 214 may analyze each element of the two-dimensional array representation of the first image to identify the luma and chroma values for each of those elements. As noted above, each element of the first image may be defined or described based on a luma value and a chroma value. Luma values—sometimes referred to as "Y" values—are the "black-and-white" or greyscale information corresponding to an element of the image. As such, the luma value of an element of the first image may represent the brightness or intensity of that element. In addition to a luma value, each element of the first image may have a corresponding chroma value, sometimes referred to as the chrominance, chroma, or "C" value. The chroma value of an element of the first image may represent the color information of the first image. In some embodiments in which the first image is encoded in a Red-Green-Blue ("RGB") color model, the chroma value be based on a difference between the luma value and a blue chroma value ("Cb") and based on a difference between the luma value and a red chroma value ("Cr"), which is sometimes referred to as the "YCbCr" color space. The multi-image fusion process 214 may similarly determine second luma values and second chroma values for the second image, in block 404, such as by performing operations similar to those performed in block 402.

In block 406, the multi-image fusion process 214 may determine first weight maps representative of multiple image characteristics of the first image based on the first luma values and the first chroma values of the first image, as determined in block 402. In a non-limiting example, the multi-image fusion process 214 may utilize the first luma and first chroma values to determine separate weight maps that account for each of the contrast, exposure, and saturation of the first image. Similarly, in block 408, the multi-image fusion process 214 may determine second weight maps representative of image characteristics of the second image based on the second luma values and the second chroma values determined in block 404. Generating the first and second weight maps is further described in an example illustrated in FIGS. 5A-5B.

In block 410, the multi-image fusion process 214 may generate a combined luma weight map based on the first and second weight maps determined in blocks 406 and 408. The multi-image fusion process 214 may utilize the combined luma weight map to control the extent to which luma values of the elements of the first and second images are represented in the fused image. In some embodiments, the combined luma weight map may be a ratio of the luma weights of the luma weight map of the first image to the sum of the weights of the luma weight maps for both the first and second images.

In block 412, the multi-image fusion process 214 may generate a color weight map based on the first and second weight maps of the image characteristics, as determined in block 406 and 408. The color weight map may include weights that are applied to the chroma values of each element of the first and second images when fusing those images to form the fused image. As such, the color weight map may control the extent to which the color information of the first image and second image are reflected in the fused image. For example, for an element of the fused image at a particular location (e.g., at a location (x,y) as described above), a high weight for the corresponding element of the first image and a low weight for the corresponding element of the second image may cause the element of the fused image at that location to represent the chroma values/information of the first image more than the chroma values/information of the second image.

In some embodiments of the operations performed in block 412, the multi-image fusion process 214 may calculate the color weight map as the absolute value of a Laplacian function applied on the first image and second image, respectively. In such embodiments, the application of the Laplacian function may emphasize or improve sharp details and texture details of the first and second images that may be carried over to the fused image.

The multi-image fusion process 214 may cease performing operations in the subroutine 400 and may return to performing operations in the routine 300 (e.g., as described with reference to FIG. 3).

Figures 5A, 5B:
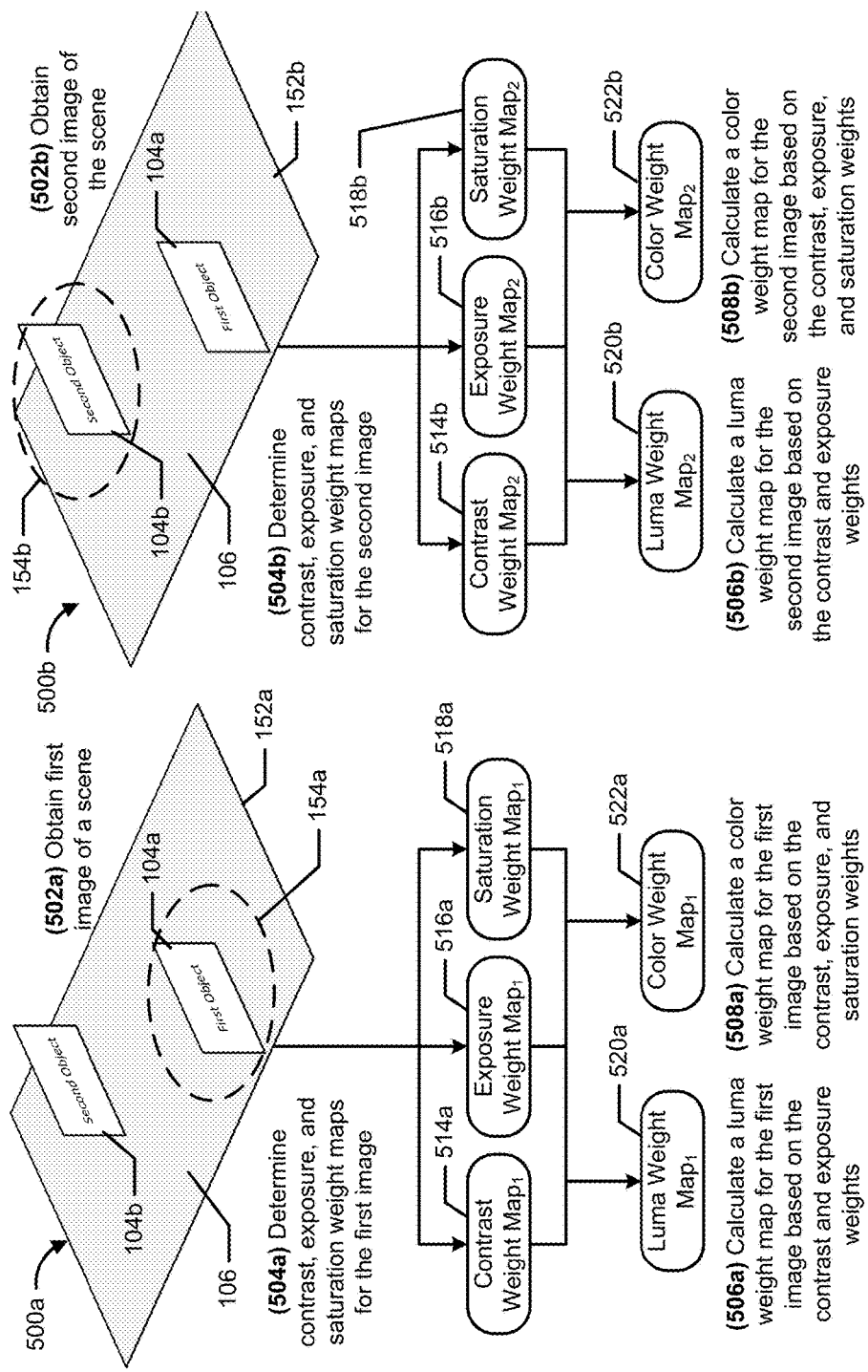
FIGS. 5A-5B are diagrams illustrating an example of a process for calculating a respective luma weight map and a respective color weight map for different images of the same scene, according to some embodiments.

FIGS. 5A and 5B are component diagrams illustrating example processes 500a and 500b for respectively determining luma values and chroma values for a first image and a second image of the scene 106 based on contrast, exposure, and color saturation image characteristics associated with those images, according to some embodiments. The processes 500a and 500b may be implemented with a multi-image fusion process operating on a computing device (e.g., the multi-image fusion process 214 of the image processing device 102 as described with reference to FIG. 4A).

As described above (e.g., with reference to FIG. 4), the multi-image fusion process 214 may determine a combined luma weight map and a combined color weight map for use in merging a first image and a second image based on weight maps calculated for image characteristics of those images. The processes illustrated in FIGS. 5A and 5B show a non-limiting example of determining luma and color weight maps for each of the first and second images. These luma and color weight maps may be combined and used to generate a fused image that accounts for multiple image characteristics of the first and second images, as further described with reference to FIG. 6.

With reference to the process 500a of FIG. 5A, the multi-image fusion process 214 may obtain the first image 152a of the scene 106. As described above (e.g., with reference to FIG. 1B), the first image 152a and the second image 152b may each depict the first object 104a and the second object 104b. The first image 152a may feature the first object 104a (represented by the indication 154a), and the second image 152b may feature the second object 104b. For example, the first object 104a may be in focus in the first image 152a and not in focus in the second image 152b. However, the second object 104a may not be in focus in the first image 152a and may be in focus in the second image 152b. The first object 104a and second object 104b may have other different image characteristics in the first and second images 152a and 152b, such as different lighting, illumination, color saturation, and the like.

In operation 504a, the multi-image fusion process 214 may determine a contrast weight map 514a, an exposure weight map 516a, and a saturation weight map 518a for the first image 152a. As described (e.g., with reference to FIG. 4), the multi-image fusion process 214 may determine a contrast weight, an exposure weight, and a saturation weight for each element of the first image 152a based on the luma and chroma values for those elements. In an example, the multi-image fusion process 214 may utilize the luma value of an element of the first image 152a to determine a contrast weight for that element by performing a high-pass filtering operation on the luma value. As such, the multi-image fusion process 214 may generate the contrast weight map 514a by determining the contrast weights for each element of the first image 152a.

In some embodiments, the multi-image fusion process 214 may calculate the exposure weight map 516a based on differences between the luma values of elements of the first image 152a and a mean or expected luma value. In particular, the multi-image fusion process 214 may calculate an exposure weight of an element of the first image 152a based on the following equations:

$$w(x, y) = e^{-\frac{(FY_1(x,y)-\mu)^2}{2\sigma^2}}$$

wherein w(x,y) is the exposure weight associated with an element at a location (x,y) of the first image 152a (e.g., an element or pixel at the coordinates (x,y)); $FY_1$ is the luma value at the location (x,y) of the first image 152a; the value $FY_1$ is between 0 and 255, inclusive; $\mu$ is the mean or expected luma value of a Gaussian distribution of luma values; and $\sigma$ is the variance of the luma values of the Gaussian distribution of luma values. As evident in the above equation, luma values that differ more from the mean may correspond with lower exposure weights than luma values that are closer to the mean luma value. In some embodiments, the mean and variance luma values may be adjustable. For example, the multi-image fusion process 214 may set the mean and/or variance value based on a user input, which may correspond with a user's preference for intensity values in the fused image. The multi-image fusion process 214 may utilize the above equation to calculate the exposure weight for each element of the first image 152a, and the exposure weight map 516a may reflect these exposure weights.

The multi-image fusion process 214 may determine a saturation weight of an element of the first image 152a based on the color information of that element. In particular the multi-image fusion process 214 may calculate the saturation weight of the element as (Cb−Cr+1). As such, the saturation weight map 518a may reflect the saturation weights calculated for each element of the first image 152a using this equation.

The multi-image fusion process 214 may calculate the luma weight map 520a for the first image 152a based on the contrast weight map 514a and the exposure weight map 516a, in operation 506a. In some embodiments, the multi-image fusion process 214 may determine the luma weight map 520a by multiplying the contrast weight map 514a and the exposure weight map 516a together.

In operation 508a, the multi-image fusion process 214 may calculate the color weight map 522a for the first image 152a based on the contrast weight map 514a, the exposure weight map 516a, and the saturation weight map 518a. In some embodiments, the color weight map 522a may be derived directly from chroma values of the elements of the first image 152a. For example, the color weight map 522a may include values that correspond to the chroma values of the pixels of the first image 152a. Particularly, a value of the color weight map 522a ("Cw") corresponding to a pixel in the first image may be determined as $C_W$=(Cb−Cr+1), wherein Cb is the blue chroma value of the pixel and Cr is the red chroma value of the pixel. As the color weight map 522a is derived from the chroma values of the first image 152a, the multi-image fusion process 214 may generate the color weight map 522a independently of the luma weight map 520a for the first image 152a.

With reference to the process 500b illustrated in FIG. 5B, the multi-image fusion process 214 may perform the operations 502b, 504b, 506b, and 508b in a manner similar to the performance of the operations 502a, 504a, 506a, and 508a described with reference to the process 500a. As such, the multi-image fusion process 214 may obtain the second image 152b of the scene 106. The second image 152b may feature the second object 104b.

In operation 504b, the multi-image fusion process 214 may determine a contrast weight map 514b, an exposure weight map 516b, and a saturation weight map 518b related to elements of the second image. In some embodiments, the multi-image fusion process 214 may determine these weight maps 514b, 516 b, and 518b based on the luma and chroma values of the elements of the second image 152b, for example, as described with reference to operation 504a.

The multi-image fusion process 214 may also calculate a luma weight map 520b and a color weight map 522b for the second image 152b, in operations 506b and 508b, respectively. In some embodiments, the multi-image fusion process 214 may calculate the luma weight map 520b and the color weight map 522b based on the contrast weight map 514b, the exposure weight map 516b, and/or the saturation weight map 518b, such as described with reference to operations 506a and 508a. In some embodiments, the multi-image fusion process 214 may generate the color weight map 522b independently of the luma weight map 520b.

Figure 6:
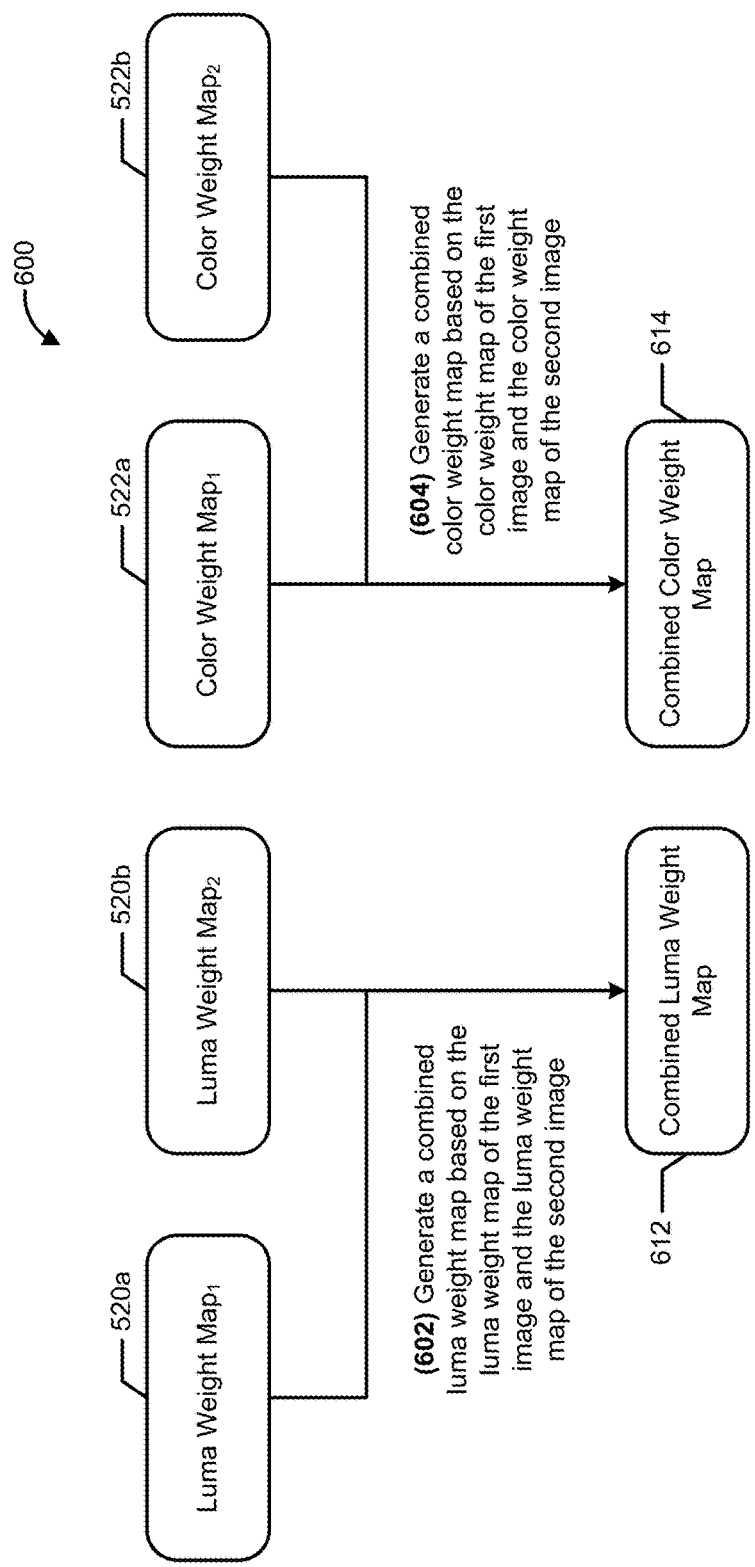
FIG. 6 is a diagram illustrating an example of a process for generating a combined luma weight map associated with multiple images of the same scene based on respective luma weight maps of multiple images of the same scene, according to some embodiments.

FIG. 6 is a component diagram illustrating an example process 600 for generating a combined luma weight map from luma weight maps and color weight maps of the first image and the second image of the scene 106, according to some embodiments. The process 600 may be implemented with a multi-image fusion process operating on a computing device (e.g., the multi-image fusion process 214 of the image processing device 102 as described with reference to FIG. 4A).

As described with reference to the processes 500a and 500b, the multi-image fusion process 214 may generate separate luma weight maps 520a and 520b and color weight maps 522a and 522b for the first image 152a and the second image 152b, respectively. In some embodiments, the multi-image fusion process 214 may perform operations of the process 600 in order to combine those separate weight maps into a combined luma weight map that may account for the contrast, exposure, and saturation information used to generate the luma weight maps 520a and 520b and the color weight maps 522a and 522b, as discussed (e.g., with reference to FIGS. 5A and 5B).

Thus, in operation 602, the multi-image fusion process 214 may generate a combined luma weight map 612 based on the luma weight map 520a of the first image and the luma weight map 520b of the second image. In some embodiments, a value of the combined luma weight map 612 may represent the ratio of a value of the luma weight map 520a of the first image to the sum or total of the value of the luma weight map 520a and a corresponding value of the luma weight map 520b of the second image 152b. The multi-image fusion process 214 may also generate a combined color weight map 614 based on the color weight map 522a of the first image and the color weight map 522b of the second image. For example, the multi-image fusion process 214 may calculate a value of the combined color weight map 614 as the ratio of a value of the color weight map 522a of the first image 152a to the sum of the value of the color weight map 522a and a corresponding value of the color weight map 522b of the second image 152b.

As further described (e.g., with reference to FIG. 8), the multi-image fusion process 214 may generate the combined color weight map 614 in operation 604. In some embodiments, the multi-image fusion process 214 may generate the combined color weight map 614 independently of the combined luma weight map 612.

Figure 7:
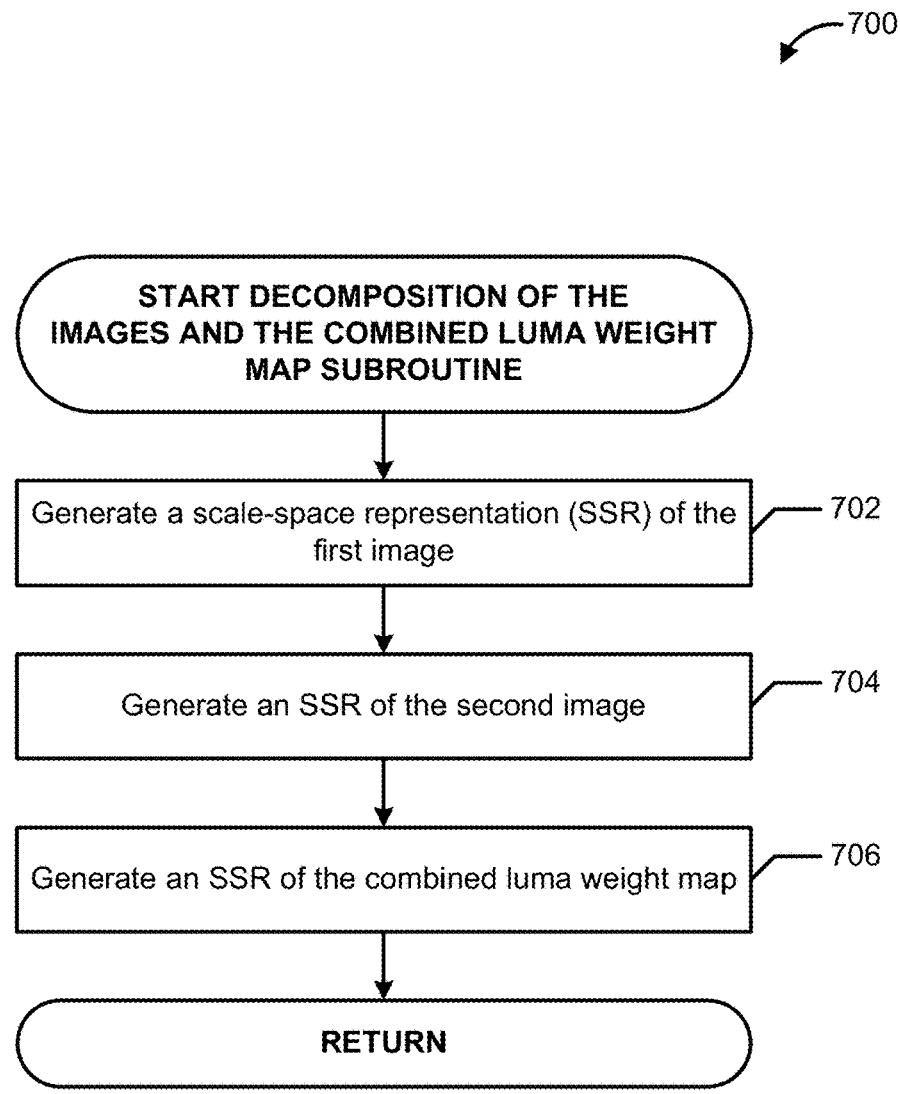
FIG. 7 is a process flow diagram illustrating an example of a computer-implemented method for decomposing multiple images of the same scene and decomposing the combined luma weight map, according to some embodiments.

FIG. 7 is a process flow diagram of an illustrative subroutine 700 for, prior to fusing the first and second images, decomposing a first image, a second image, and a combined luma weight map generated from the image characteristics of the first and second images, according to some embodiments. The subroutine 700 may be implemented with a multi-image fusion process operating on a computing device (e.g., the multi-image fusion process 214 of the image processing device 102 as described with reference to FIG. 4A).

As described, the multi-image fusion process 214 may generate a combined luma weight map that accounts for multiple image characteristics of the images to be fused together. In some embodiments, the multi-image fusion process 214 may decompose the images to be fused together, as well as the combined luma weight map, into alternative representations that may be merged together to produce a fused image.

Thus, in block 702, the multi-image fusion process 214 may generate a scale-space representation ("SSR") of the first image. The SSR of the first image may include multiple levels or scales that represent different frequency components of the image, such as levels arranged from high frequencies to low frequencies. In some embodiments of the operations performed in block 702, the multi-image fusion process 214 may decompose the space domain of the first image into different frequency components by applying successive high-pass filters on the first image. For example, the multi-image fusion process 214 may apply a low-pass filter on the first image and may also calculate a difference of the low-pass filtered output with the original first image, which may represent the high-frequency components of the first image. The multi-image fusion process 214 may repeat this process with different kernel sizes or, in some instances, with the same kernel size but with different scales of the first image.

In some embodiments, the multi-image fusion process 214 may decompose the first image in block 702 by using bilinear downscaling & upscaling. Bilinear smoothing may be accomplished relatively quickly and with comparatively few processing resources. However, in some embodiments, the multi-image fusion process 214 may utilize more complex smoothing kernels that have better image quality (e.g., Gaussian smoothing), but may require additional processing time or resources.

In some embodiments of the operations performed in block 702, the multi-image fusion process 214 may generate the SSR of the first image based on the following equations:

$$FY_1\_Smooth_0(x,y)=FY_1(x,y)$$

$$FY_1\_Smooth_1(x,y)=SC\_DOWN\_2(FY_1(x,y))$$

$$FY_1\_Smooth_i(x,y)=SC\_DOWN\_2(FY_1\_Smooth_{i-1}(x,y))$$

$$FY_1\_Diff_0(x,y)=FY_1\_Smooth_0(x,y)-SC\_UP\_2(FY_1\_Smooth_1(x,y))$$

$$FY_1\_Diff_i(x,y)=FY_1\_Smooth_i(x,y)-SC\_UP\_2(FY_1\_Smooth_{i+1}(x,y))$$

$$FY_1\_Diff_N(x,y)=FY_1\_Smooth_N(x,y)$$

wherein $FY_1$ is the luma value of an element located at (x,y) in the first image; $FY_1\_Smooth_i(x,y)$ is the downscaled, smoothed luma value of an element located at (x,y) in the ith level of the SSR of the first image; SC_DOWN_2 is a bilinear downscaling function; SC_UP_2 is a bilinear upscaling function; and $FY_1\_Diff_i(x,y)$ is the difference value of an element located at (x,y) of the ith level of the SSR of the first image.

In some embodiments, as a result of performing the operations in block 702, the multi-image fusion process 214 may produce an SSR of the first image having multiple levels. An SSR includes multiple representations of an image, and each representation or "level" corresponds to spatial frequencies in different frequency bands, with each band having a width determine by the amount of downscaling used to generate that band. As such, each levels of an SSR may represent a different resolution or scale of the original first image. In an example, the multi-image fusion process 214 may decompose the first image into an SSR having four levels. The first level may correspond to the scale of the original first image (the dimensional ratio of the first level of the SSR to the original first image may be one to one). The second, third, and fourth levels may be scaled by one half, one fourth, and one eighth the size of the original first image, respectively. In this example, in the event the original first image has a length of 128 pixels and a height of 128 pixels (e.g., 128×128 pixels), the first level of the SSR may be a representation having the dimensions 128×128 pixels, the second level of the SSR may be 64×64 pixels, the third level of the SSR may be 32×32 pixels, and the fourth level of the SSR may be 16×16 pixels. In such embodiments, the multi-image fusion process 214 may generate each of the levels of the SSR of the first image to exaggerate certain desired details and/or to reduce certain undesirable details in the original first image.

According to some embodiments, the multi-image fusion process 214 may also generate an SSR of the second image, in block 704, such as by performing operations similar to the operations described with reference to block 702. For example, the multi-image fusion process 214 may generate the SSR of the second image based on the luma values of the second image and based on the above equations.

In block 706, the multi-image fusion process 214 may generate an SSR of the combined luma weight map. In some embodiments, the multi-image fusion process 214 may perform bilinear down scaling and smoothing operations on the combined luma weight map in order to create an SSR with the same number of levels as the SSR of the first image generated in block 702 and the SSR of the second image generated in block 704. The weights of the levels of the SSR representation of the combined luma weight map may be represented with the following equations:

$$\alpha_0(x,y)=\alpha(x,y)$$

$$\alpha_{0.5}(x,y)=SC\_DOWN\_2(\alpha_0(x,y))$$

$$\alpha_1(x,y)=SC\_DOWN\_2(\alpha_{0.5}(x,y))$$

$$\alpha_i(x,y)=SC\_DOWN\_2(\alpha_{i-1}(x,y))$$

wherein $\alpha(x,y)$ is a weight located at (x,y) of the combined luma weight map; $\alpha_i(x,y)$ is a weight located at (x,y) of an ith level of the SSR of the combined luma weight map; $\alpha_{0.5}(x,y)$ is a weight located at (x,y) of an intermediate level between the first and second levels of the SSR of the combined luma weight map generated by downscaling the original weight map $\propto(x,y)$; and SC_DOWN_2 is a bilinear downscaling function applied to a weight of a level of the SSR of the combined luma weight map.

The multi-image fusion process 214 may cease performing operations in the subroutine 700 and may return to performing operations in the routine 300 (e.g., as described with reference to FIG. 3).

Figure 8:
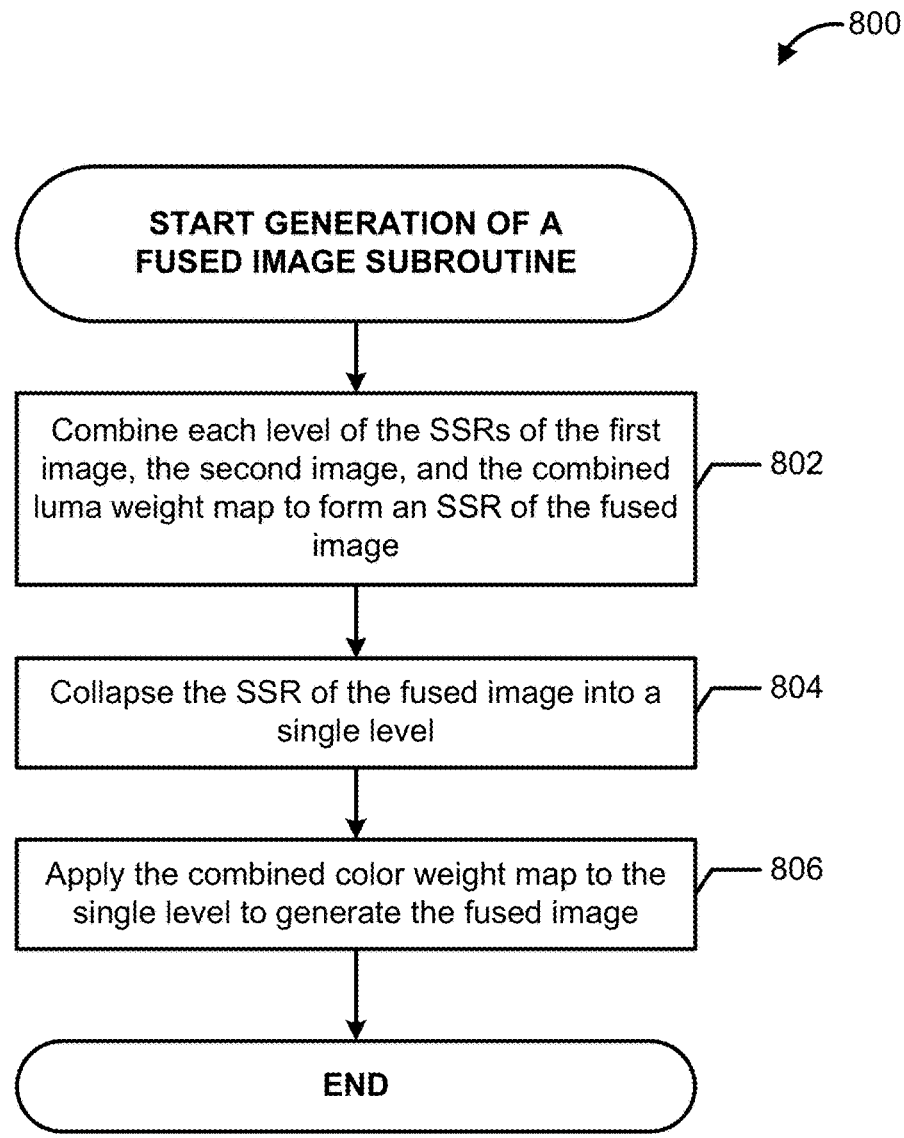
FIG. 8 is a process flow diagram illustrating an example of a computer-implemented method for generating a fused image by combining levels of scale-space representations of multiple images of the same scene and the combined luma weight map, according to some embodiments.

FIG. 8 is a process flow diagram of an illustrative subroutine 800 for generating a fused image by combining corresponding levels of the scale-space representations (SSRs) of the first image, second image, and the combined luma weight map, according to some embodiments. The subroutine 800 may be implemented with a multi-image fusion process operating on a computing device (e.g., the multi-image fusion process 214 of the image processing device 102 as described with reference to FIG. 4A).

In block 802, the multi-image fusion process 214 may combine each level of the SSRs of the first image, the second image, and the combined luma weight map to form an SSR of the fused image. In some embodiments, the multi-image fusion process 214 may fuse a level of the SSRs of the first image, the second image, and the combine luma weight map based on the following equation:

$$FY_{fused}\_Diff_i(x,y) = (FY_1\_Diff_i(x,y))*\propto_i(x,y)) + (FY_2\_Diff_i(x,y)*(1-\propto_i(x,y)))$$

wherein $FY_{fused}\_Diff_i(x,y)$ is the luma value of an element located at $(x,y)$ in the ith level of the SSR of the fused image; $FY_1\_Diff_i(x,y)$ is the luma value of an element located at $(x,y)$ in the ith level of the SSR of the first image (as described above with reference to FIG. 7); $FY_2\_Diff_i(x,y)$ is the luma value of an element located at $(x,y)$ in the ith level of the SSR of the second image; and $\propto_i(x,y)$ is the luma weight corresponding to an element located at $(x,y)$ of the ith level of the SSR of the combined luma weight map.

In block 804, the multi-image fusion process 214 may collapse the SSR of the fused image into a single level. In some embodiments, the multi-image fusion process 214 may perform the decomposition operations (e.g., described with reference to FIG. 7) in reverse order in order to construct a single level representation of the fused image. For example, the multi-image fusion process 214 may utilize the following equations to form a single level representation of the fused image:

$$FY_{fused}\_Smooth_N(x,y) = FY_{fused}\_Diff_N(x,y)$$

$$FY_{fused}\_Smooth_i(x,y) = FY_{fused}\_Diff_i(x,y) + SC\_UP\_2(FY_{fused}\_Smooth_{i+1}(x,y))$$

$$FY_{fused}(x,y) = FY_{fused}\_Diff_0(x,y) + SC\_UP\_2(FY_{fused}\_Smooth_1(x,y))$$

wherein $FY_{fused}\_Smooth_i(x,y)$ is the smoothed luma value of an element located at $(x,y)$ in the ith level of the SSR of the fused image; $FY_{fused}\_Diff_i(x,y)$ is the luma value of an element located at $(x,y)$ in the ith level of the SSR of the fused image (as described above); and $FY_{fused}(x,y)$ is the luma value of an element located at $(x,y)$ in the collapsed, single level representation of the fused image.

In block 806, the multi-image fusion process 214 may apply the combined color weight map to the single level representation of the fused image to generate the final fused image. In some embodiments, the single level representation of the fused image may include the final luma or intensity information needed to generate the fused image but may not include the color or chroma information needed to generate the fused image. As such, the multi-image fusion process 214 may use the combined color weight map to determine such color information. In some embodiments, the multi-image fusion process 214 may calculate the chroma values for the fused images based on the following equations:

$$FCb_{fused}(x,y) = FCb_1(x,y)*\propto_{0.5}(x,y) + FCb_2(x,y)*(1-\propto_{0.5}(x,y))$$

$$FCr_{fused}(x,y) = FCr_1(x,y)*\propto_{0.5}(x,y) + FCr_2(x,y)*(1-\propto_{0.5}(x,y))$$

wherein $FCb_{fused}(x,y)$ is the final Cb chroma value for an element of the fused image located at $(x,y)$; $FCr_{fused}(x,y)$ is the final Cr chroma value for an element of the fused image located at $(x,y)$; $FCb_1(x,y)$ and $FCb_2(x,y)$ are the Cb chroma values for respective elements of the first image and the second image located at $(x,y)$; $FCr_1(x,y)$ and $FCr_2(x,y)$ are the Cr chroma values for respective elements of the first image and the second image located at $(x,y)$; and $\propto_{0.5}(x,y)$ is a weight of an intermediate level (e.g., 0.5) of the SSR of the combined luma weight map (e.g., as described with reference to FIG. 7).

The multi-image fusion process 214 may then cease performing operations in the subroutine 800.

For ease of description, various embodiments described above are directed to fusing a first image and a second image together. However, in some embodiments, the multi-image fusion process 214 may fuse more than two images together. Specifically, the multi-image fusion process 214 may compensate for the different image characteristics of more than two objects in a scene by capturing a separate image for each of the more-than-two objects and by merging those images together. An example of merging more than two images together, according to some embodiments, is described with reference to a process 900 illustrated in FIG. 9.

Figure 9:
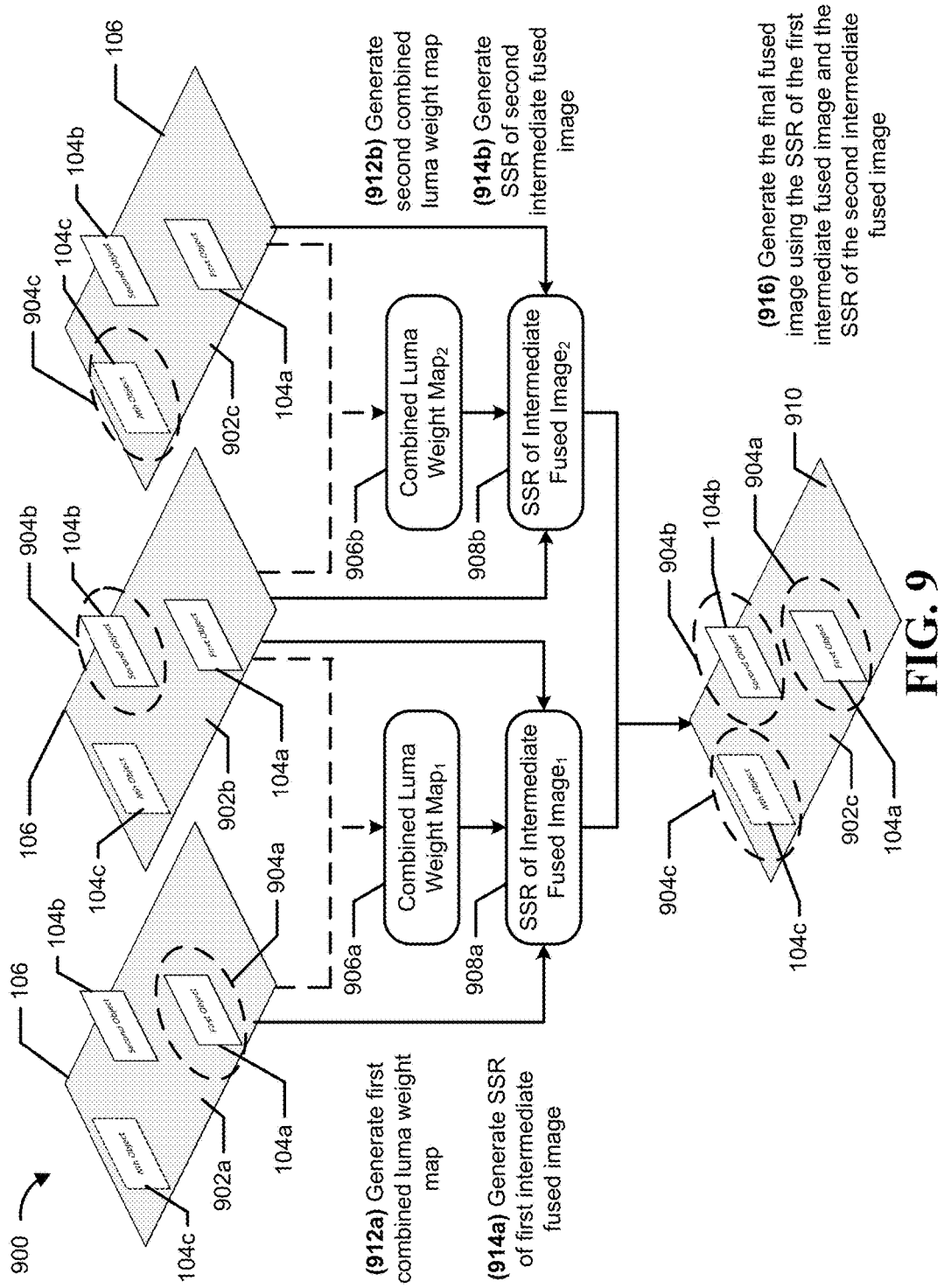
FIG. 9 is a component diagram schematically illustrating an example of a process for fusing more than two images of a scene together, according to some embodiments.

In the example illustrated in FIG. 9, the multi-image fusion process 214 may capture a separate image for each of the objects 104a, 104b, and 104c that features the desirable image characteristics of each respective object. For example, the multi-image fusion process 214 may capture a first image 902a of a scene (e.g., the scene 106 described with reference to FIG. 1A) that features desirable image characteristics of the first object 104a, as indicated by an indicator 904a. In this example, the first image 902a may depict the first object 104a in focus, well lit, and with a desirable exposure, among other image characteristics. Similarly, the multi-image fusion process 214 may capture a second image 902b of the scene 106 in which desirable image characteristics of the second object 104b are featured, as indicated by an indicator 904b. The multi-image fusion process 214 may also capture a third image 902c of the scene 106 in which desirable image characteristics of the third object 104c are featured, as indicated by an indicator 904c.

In operation 912a, the multi-image fusion process 214 may generate a combined luma weight map 906a based on the image characteristics of the first image 902a and the second image 902b. In an example, the multi-image fusion process 214 may perform operation 912a by performing operations similar to those operations described with reference to the subroutine 400 (see FIG. 4) using image characteristics derived from the first image 902a and the second image 902b. The multi-image fusion process 214 may utilize the combined luma weight map 906a, the first image 902a, and the second image 902b to form an SSR representation of a first intermediate fused image 908a, in operation 914a. In some embodiments, the multi-image fusion process 214 may perform the operation 914a by performing operations similar to those described with reference blocks 702-706 of the subroutine 700 and block 802 of the subroutine 800 using the combined luma weight map 906*a*, the first image 902*a*, and the second image 902*b*.

Instead of collapsing the SSR representation of the first intermediate fused image 908*a*, however, the multi-image fusion process 214 may, in operation 912*b*, generate a second combined luma weight map 906*b* using the image characteristics of the second image 902*b* and the third image 902*c*. In some embodiments, the operations performed in operation 912*b* may be similar to those operations performed in operation 912*a*. In operation 914*b*, the multi-image fusion process 214 may also generate an SSR representation of a second intermediate fused image 908*b* using the combined luma weight map 906*b*, the second image 902*b*, and the third image 902*c*. For example, the multi-image fusion process 214 may decompose the second image 902*b*, the third image 902*c*, and the combined luma weight map 906*b* into SSR representations and combine those SSR representations to form the SSR of the second intermediate fused image 914*b*.

In operation 916, the multi-image fusion process 214 may generate the final fused image 910 using the SSR of the first intermediate fused image 908*a* and the SSR of the second intermediate fused image 908*b*. In particular, in order to fuse all three images 902*a*, 902*b*, and 902*c* together, the multi-image fusion process 214 may add each level of the SSR representation of the first intermediate fused image 908*a* with each corresponding level of the SSR representation of the second intermediate fused image 908*b* to form a combined SSR representation of the fused image (not shown). The multi-image fusion process 214 may then collapse the combined SSR representation of the fused image into a single level representation of the fused image (not shown) and may apply a first combined color weight map associated with the first image 902*a* and the second image 902*b* and a second combined color weight map associated with the second image 902*b* and the third image 902*c* to the single level representation to generate the final fused image 910. Thus, as depicted in the example illustrated in FIG. 9, the final fused image 910 may feature the desirable image characteristics for all three of the images 902*a*, 902*b*, and 902*c*, as indicated by the indicators 904*a*, 904*b*, and 904*c*.

Further, while the description of this example includes three images, the multi-image fusion process 214 may similarly generate the final fused image using an arbitrary number of images greater than one by performing similar operations.

Alternatively, in some embodiments, the multi-image fusion process 214 may fuse two or more images by generating a final fused image for a first pair of images and fusing that final fused image with additional images. For example, the multi-image fusion process 214 may fuse a first image and a second image together to form a fused image (e.g., as described above). The multi-image fusion process 214 may then fuse the fused image with a third image by performing operations similar to operations used to merge the first image and the second image together. As such, the multi-image fusion process 214 may continue combining the resulting fused images with additional images until a final fused image is created.

The detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to, or other than one or more of the aspects set forth herein.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for fusing multiple images, the method performed by a computing device and comprising:
   determining first image characteristics of a first image and second image characteristics of a second image, the first image depicting a target scene at a first exposure and a first focus and the second image depicting the target scene at a second exposure and a second focus, the second exposure different than the first exposure and the second focus different than the first focus;
   generating a combined luma weight map based on the first image characteristics of the first image and the second image characteristics of the second image;
   decomposing the first image, the second image, and the combined luma weight map to form a decomposed first image, a decomposed second image, and a decomposed luma weight map; and
   generating a fused image of the first image and the second image based at least in part on the decomposed first image, the decomposed second image, and the decomposed luma weight map.

2. The method of claim 1, wherein:
   the first image comprises a first object and a second object having the first image characteristics; and
   the second image comprises the first object and the second object having the second image characteristics.

3. The method of claim 1, wherein generating the combined luma weight map based on the first image characteristics and the second image characteristics comprises:
   determining first weight maps representative of the first image characteristics;
   generating a first luma weight map of the first image based on the first weight maps;
   determining second weight maps representative of the second image characteristics;
   generating a second luma weight map of the second image based on the second weight maps; and
   generating the combined luma weight based on the first luma weight map and the second weight map.

4. The method of claim 3, wherein each of the first weight maps and the second weight maps comprises two or more of a contrast weight map, an exposure weight map, and a color saturation weight map.

5. The method of claim 3, wherein determining the first weight maps of the first image characteristics of the first image comprises:
   determining luma values and chroma values of the first image;
   determining a contrast weight map of the first image by performing a high-pass filter operation on the luma values of the first image;
   determining an exposure weight map of the first image based on a difference between the luma values of the first image and an expected luma value; and
   determining a color saturation weight map of the first image based on the chroma values of the first image or based on the chroma values of the first image and the luma values of the first image.

6. The method of claim 5, further comprising receiving the expected luma value via a user input.

7. The method of claim 3, further comprising generating a combined color weight map based on the first image characteristics and the second image characteristics.

8. The method of claim 7, wherein generating the combined color weight map comprises generating the combined color weight based on the first weight maps and the second weight maps.

9. The method of claim 3, wherein decomposing the first image, the second image, and the combined luma weight map comprises:

generating a scale-space representation ("SSR") of the first image; and generating an SSR of the second image; and generating an SSR of the combined luma weight map.

10. The method of claim 9, wherein generating the SSR of the first image comprises performing upscaling and downscaling operations on the first image.

11. The method of claim 10, wherein the upscaling and downscaling operations are bilinear upscaling and bilinear downscaling operations.

12. The method of claim 9, wherein generating the fused image of the first image and the second image based at least in part on the decomposed first image, the decomposed second image, and the decomposed luma weight map comprises:
generating an SSR of the fused image by combining levels of the SSR of the first image with corresponding levels of the SSR of the second image and with corresponding levels of the SSR of the luma weight map; and
collapsing the SSR of the fused image into a single level representation of the fused image.

13. The method of claim 12, further comprising:
generating the combined color weight map based on the first image characteristics and the second image characteristics; and
generating the fused image by applying the combined color weight map to the single level representation of the fused image.

14. The method of claim 1, further comprising:
determining image characteristics of a third image and image characteristics of the fused image, the third image depicting the target scene;
generating another combined luma weight map based on the image characteristics of the third image and the image characteristics of the fused image;
decomposing the third image, the fused image, and the other combined luma weight map to form a decomposed third image, a decomposed fused image, and a decomposed other combined luma weight map; and
generating another fused image of the third image and the fused image based at least in part on the decomposed third image, the decomposed fused image, and the decomposed other combined luma weight map.

15. The method of claim 1, further comprising:
determining third image characteristics of a third image, the third image depicting the target scene;
generating another combined luma weight map based on the second image characteristics of the second image and the third image characteristics of the third image; and
decomposing the second image, the third image, and the other combined luma weight map to form a decomposed second image, a decomposed third image, and a decomposed other combined luma weight map.

16. The method of claim 15, wherein generating the fused image of the first image and the second image comprises:
generating a scale-space representation ("SSR") of a first intermediate fused image based on the decomposed first image, the decomposed second image, and the decomposed other combined luma weight map;
generating an SSR of a second intermediate fused image based on the decomposed second image, the decomposed third image, and the decomposed other combined luma weight map;
combining the SSR of the first intermediate fused image and the SSR of the second intermediate fused image to generate a combined SSR; and
generating a final fused image of the first image, the second image, and the third image based at least in part on the combined SSR.

17. A system, comprising:
a memory; and
a processor coupled to the memory and configured with processor-executable instructions to perform operations comprising:
determining first image characteristics of a first image and second image characteristics of a second image, the first image depicting a target scene at a first exposure and a first focus and the second image depicting the target scene at a second exposure and a second focus, the second exposure different than the first exposure and the second focus different than the first focus;
generating a combined luma weight map based on the first image characteristics of the first image and the second image characteristics of the second image;
decomposing the first image, the second image, and the combined luma weight map to form a decomposed first image, a decomposed second image, and a decomposed luma weight map; and
generating a fused image of the first image and the second image based at least in part on the decomposed first image, the decomposed second image, and the decomposed luma weight map.

18. The system of claim 17, wherein:
the first image depicts the target scene comprising a first object and a second object having the first image characteristics; and
the second image depicts the target scene comprising the first object and the second object having the second image characteristics.

19. The system of claim 17, wherein the processor is configured to execute processor-executable instructions to perform operations such that generating the combined luma weight map based on the first image characteristics and the second image characteristics comprises:
determining first weight maps of the first image characteristics;
generating a first luma weight map of the first image based on the first weight maps;
determining second weight maps of the second image characteristics;
generating a second luma weight map of the second image based on the second weight maps; and
generating the combined luma weight based on the first luma weight map and the second weight map.

20. The system of claim 19, wherein the processor is configured to execute processor-executable instructions to perform operations such that each of the first weight maps and the second weight maps comprises two or more of a contrast weight map, an exposure weight map, and a color saturation weight map.

21. The system of claim 19, wherein the processor is configured to execute processor-executable instructions to perform operations such that determining the first weight maps of the first image characteristics of the first image comprises:
determining luma values and chroma values of the first image;

determining a contrast weight map of the first image by performing a high-pass filter operation on the luma values of the first image;

determining an exposure weight map of the first image based on a difference between the luma values of the first image and an expected luma value; and determining a color saturation weight map of the first image based on the chroma values of the first image.

22. The system of claim 21, wherein the processor is configured to execute processor-executable instructions to perform operations further comprising receiving the expected luma value via a user input.

23. The system of claim 19, wherein the processor is configured to execute processor-executable instructions to perform operations further comprising generating a combined color weight map based on the first image characteristics and the second image characteristics.

24. The system of claim 23, wherein the processor is configured to execute processor-executable instructions to perform operations such that generating the combined color weight map comprises generating the combined color weight based on the first weight maps and the second weight maps.

25. The system of claim 19, wherein the processor is configured to execute processor-executable instructions to perform operations such that decomposing the first image, the second image, and the combined luma weight map comprises:

generating a scale-space representation ("SSR") of the first image; and generating an SSR of the second image; and generating an SSR of the combined luma weight map.

26. The system of claim 25, wherein the processor is configured to execute processor-executable instructions to perform operations such that generating the SSR of the first image comprises performing upscaling and downscaling operations on the first image.

27. The system of claim 26, wherein the processor is configured to execute processor-executable instructions to perform operations such that the upscaling and downscaling operations are bilinear upscaling and bilinear downscaling operations.

28. The system of claim 26, wherein the processor is configured to execute processor-executable instructions to perform operations such that generating the fused image of the first image and the second image based at least in part on the decomposed first image, the decomposed second image, and the decomposed luma weight map comprises:

generating an SSR of the fused image by combining levels of the SSR of the first image with corresponding levels of the SSR of the second image and with corresponding levels of the SSR of the luma weight map; and collapsing the SSR of the fused image into a single level representation of the fused image.

29. A non-transitory, computer-readable medium having stored thereon computer-executable software instructions configured to cause a processor of an image processing device to perform operations comprising:

determining first image characteristics of a first image and second image characteristics of a second image, the first image depicting a target scene at a first exposure and a first focus and the second image depicting the target scene at a second exposure and a second focus, the second exposure different than the first exposure and the second focus different than the first focus;

generating a combined luma weight map based on the first image characteristics of the first image and the second image characteristics of the second image;

decomposing the first image, the second image, and the combined luma weight map to form a decomposed first image, a decomposed second image, and a decomposed luma weight map; and generating a fused image of the first image and the second image based at least in part on the decomposed first image, the decomposed second image, and the decomposed luma weight map.

30. A system, comprising:

means for determining first image characteristics of a first image and second image characteristics of a second image, the first image depicting a target scene at a first exposure and a first focus and the second image depicting the target scene at a second exposure and a second focus, the second exposure different than the first exposure and the second focus different than the first focus;

means for generating a combined luma weight map based on the first image characteristics of the first image and the second image characteristics of the second image;

means for decomposing the first image, the second image, and the combined luma weight map to form a decomposed first image, a decomposed second image, and a decomposed luma weight map; and means for generating a fused image of the first image and the second image based at least in part on the decomposed first image, the decomposed second image, and the decomposed luma weight map.

* * * * *